United States Patent [19]
Liu

[11] Patent Number: 5,531,296
[45] Date of Patent: Jul. 2, 1996

[54] BRAKE CONTROL MECHANISM FOR A BICYCLE

[76] Inventor: Robert Z. Liu, No. 9, Alley 62, Lane 168, Feng Dong Road, Feng Yuan City, Taichung County, Taiwan

[21] Appl. No.: 416,356

[22] Filed: Apr. 4, 1995

[51] Int. Cl.$^6$ ..................................................... B62L 1/14
[52] U.S. Cl. ..................................................... 188/24.21
[58] Field of Search ............................. 188/2 D, 24.11, 188/24.12, 24.21, 24.22

[56] References Cited

U.S. PATENT DOCUMENTS

| 4,027,746 | 6/1977 | Kine | 188/24.21 X |
| 5,060,534 | 10/1991 | Yoshigai | 188/24.21 X |
| 5,099,958 | 3/1992 | D'Aluisio | 188/24.12 X |
| 5,293,965 | 3/1994 | Nagano | 188/24.21 |

FOREIGN PATENT DOCUMENTS

| 530716 | 3/1993 | European Pat. Off. | 188/24.21 |
| 540002 | 5/1993 | European Pat. Off. | 188/24.21 |
| 4217958 | 12/1993 | Germany | 188/24.21 |

Primary Examiner—Josie Ballato
Attorney, Agent, or Firm—Morton J. Rosenberg; David I. Klein

[57] ABSTRACT

A brake mechanism includes a frame having a pair of brake arms pivotally coupled to the legs of the frame. A coupler includes an opening and a ring having a puncture communicating with the opening. The coupler is coupled to the upper portion of the frame by a cable and coupled to one of the brake arm by another cable. A sleeve has one end engaged in the opening and engaged with the ring, and another cable is engaged in the sleeve and has one end engaged through the ring and secured to the other brake arm in order to operate and to actuate the brake arms.

2 Claims, 6 Drawing Sheets

BRAKE CONTROL MECHANISM FOR A BICYCLE

BACKGROUND OF THE INVENTION

1. Field of the Invention

The present invention relates to a brake mechanism, and more particularly to a brake control mechanism for a bicycle.

2. Description of the Prior Art

A typical brake control mechanism is shown in FIG. 5 and comprises a pair of brake arms 60, 61 pivotally coupled together and each having an extension 601, 610 extended therefrom for engaging with a sleeve 63 and a cable 62 respectively. The cable 62 may move the extensions 601, 610 toward each other for forcing the brake shoes to clamp the rim of the bicycle wheels so as to conduct brake operations. The brake shoes of the brake mechanism may be easily rotated and moved toward one side such that the bicycle wheel may not be suitably braked.

Another typical brake mechanism is shown in FIG. 6 and comprises a pair of brake arms 70, 71 having one end coupled together by a cable 72 and having brake shoes 701, 710 provided on the other end for engaging with and for braking the rim 81 of the bicycle wheel 80. A bracket 74 is engaged with the middle portion of the cable 72 and is coupled to another cable 73 which may move the bracket 74 in order to actuate the brake shoes 701, 710. However, the cable 72 should first be disengaged from the bracket 74 such that the wheel 80 may be replaced or repaired. In addition, the cable 72 may not be easily disengaged from and be engaged with the bracket 74.

The present invention has arisen to mitigate and/or obviate the afore-described disadvantages of the conventional bicycle brake mechanisms.

SUMMARY OF THE INVENTION

The primary objective of the present invention is to provide a bicycle brake mechanism which may be easily assembled and disassembled and which may be easily operated.

In accordance with one aspect of the invention, there is provided a brake mechanism for a bicycle comprising a frame including a pair of legs and including an upper portion, a pair of brake arms pivotally coupled to the legs of the frame respectively, a coupler including an opening formed therein and including a first end having a ring formed therein, the ring including a puncture communicating with the opening, the coupler including a middle portion and a second end, a first cable means coupling the center portion of the coupler to the upper portion of the frame, a second cable means coupling a first of the brake arms to the second end of the coupler, a sleeve including a first end engaged in the opening of the coupler and engaged with the ring, and a third cable means engaged in the sleeve and including a first end engaged through the puncture of the ring and secured to a second of the brake arms. The brake arms are operated and actuated when the second brake arm is pulled toward the coupler relatively by the third cable means.

The second end of the coupler includes a hole and a notch formed therein, the second cable means includes a first end having a stud secured thereto, the stud includes a first end for engaging with the hole of the coupler and includes a second end for engaging with the notch of the coupler, the stud is disengaged from the coupler when the second end of the stud is disengaged from the notch of the coupler.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
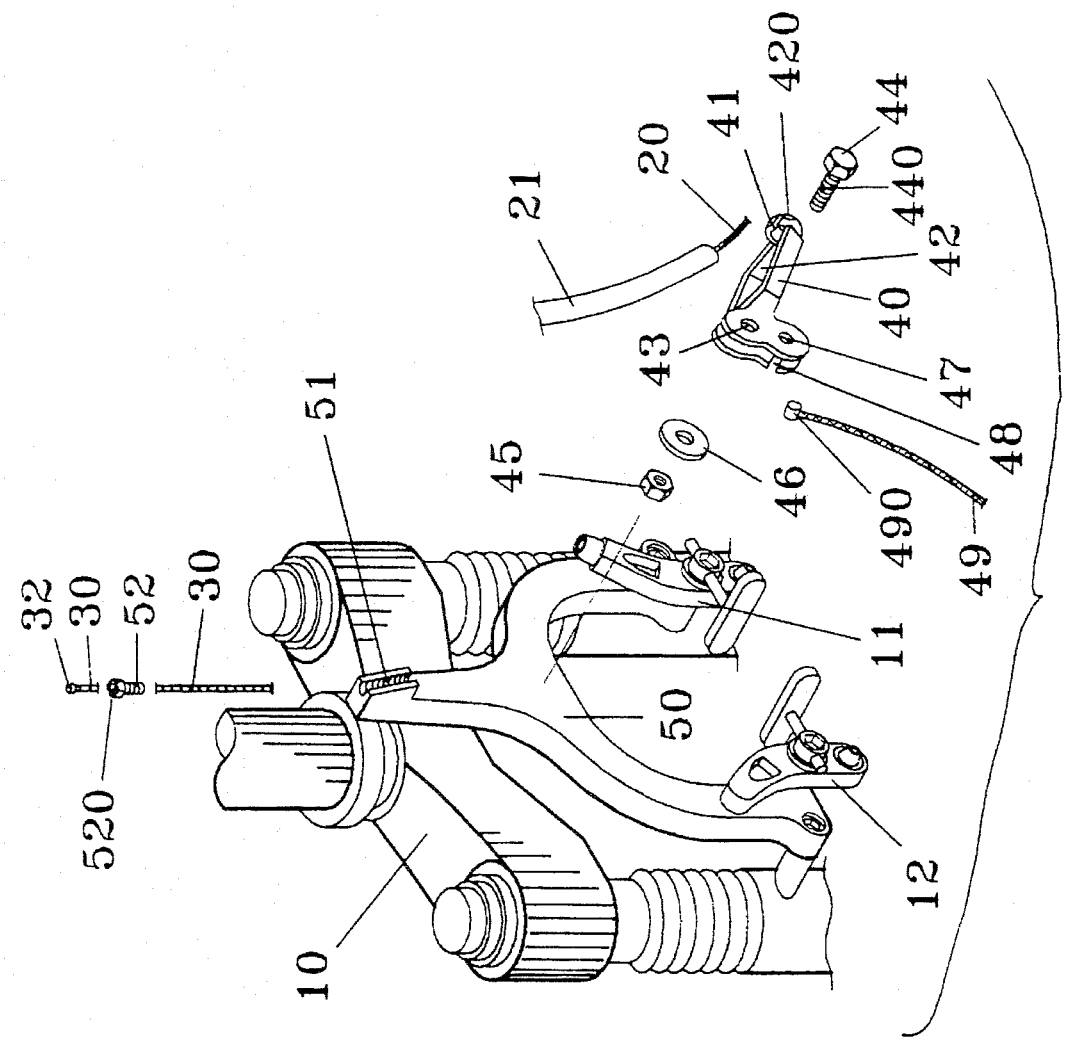
FIG. 1 is an exploded view of a bicycle brake mechanism in accordance with the present invention.
Figure 2:
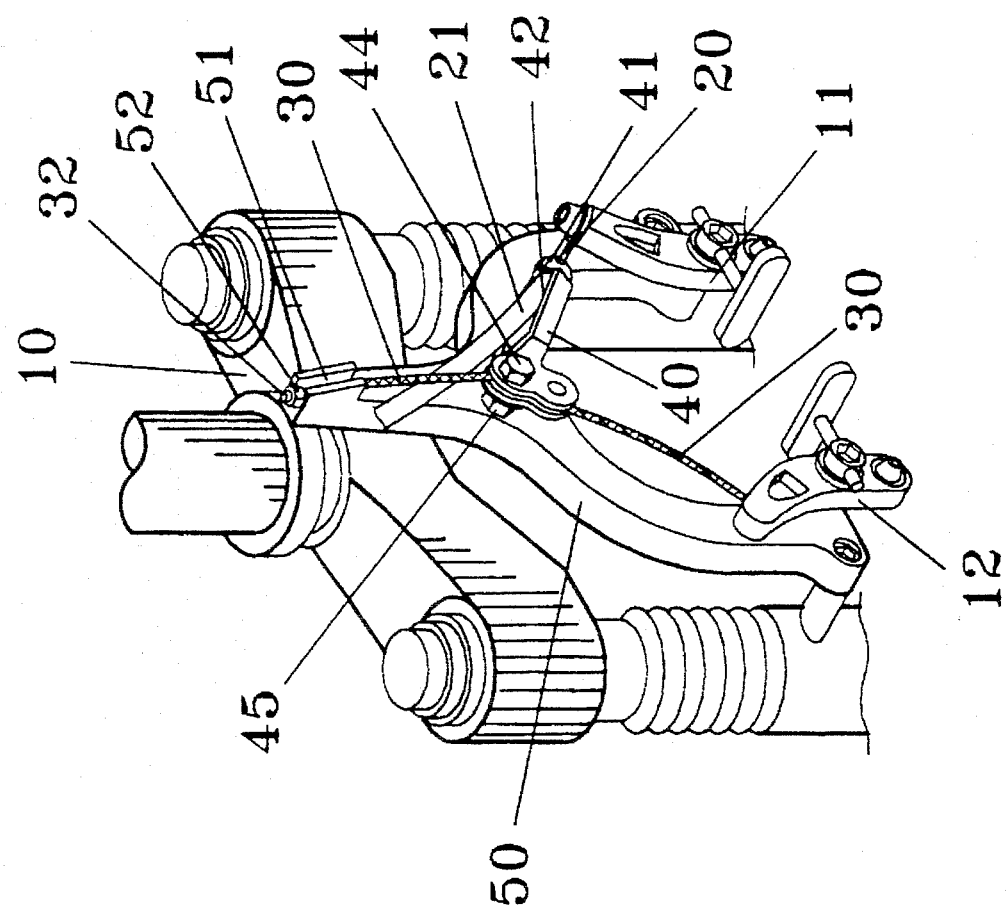
FIG. 2 is a perspective view of the bicycle brake mechanism.
Figure 3:
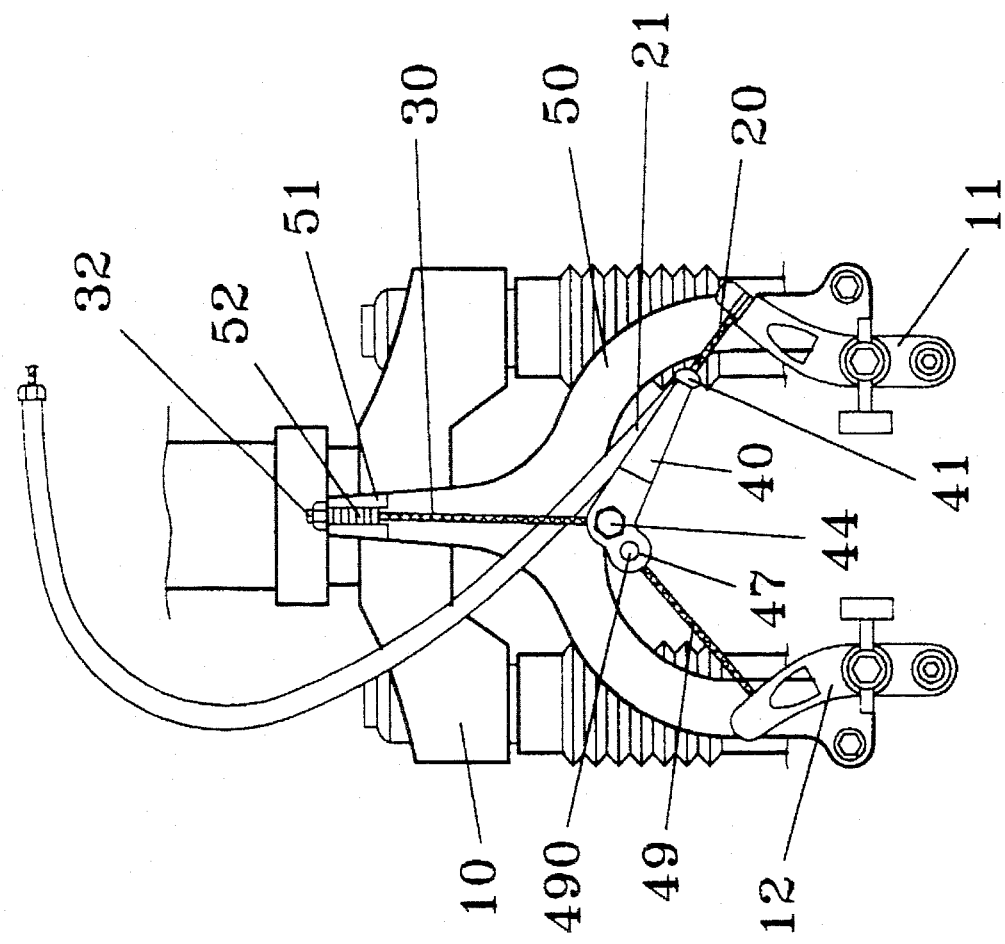
FIGS. 3 and 4 are plane views illustrating the operations of the brake mechanism.

Referring to the drawings, and initially to FIGS. 1 to 3, a bicycle brake mechanism in accordance with the present invention comprises a frame 50 secured to the bicycle frame 10 and including a pair of legs each having a brake arm 11, 12 pivotally coupled thereto and including an upper end having a screw hole 51 formed therein for engaging with a bolt 52. The bolt 52 includes a bore 520 for engaging with a cable 30 which includes an enlarged head 32 provided on top thereof for engaging with the bolt 52. The brake arms 11, 12 include typical biasing means for biasing the brake shoes away from the wheel.

A coupler 40 includes an opening 42 formed therein and includes a ring 41 having a puncture 420 communicating with the opening 42 for engaging with a cable 20 which is engaged in a sleeve 21. The sleeve 21 includes one end engaged with the ring 41, best shown in FIGS. 2 and 3. The cable 20 couples to the brake arm 11 to a brake handle which may actuate the brake arm 11 by the cable 20. The coupler 40 includes a center portion having an orifice 43 formed therein for engaging with a bolt 44 which includes an aperture 440 formed therein for engaging with the lower end of the cable 30 and which is engaged with a washer 46 and a nut 45 for fixing the lower end of the cable 30 to the coupler 40. The coupler 40 further includes a second end having a hole 47 and a notch 48 formed therein for engaging with a stud 490 which is solidly secured on one end of a cable 49. The stud 490 includes one end engaged in the hole 47 and includes the other end engaged in the notch 48. When required, the stud 490 may be easily disengaged from the hole 47 and the notch 48. The cable 49 includes another end coupled to the brake arm 12.

Figure 4:
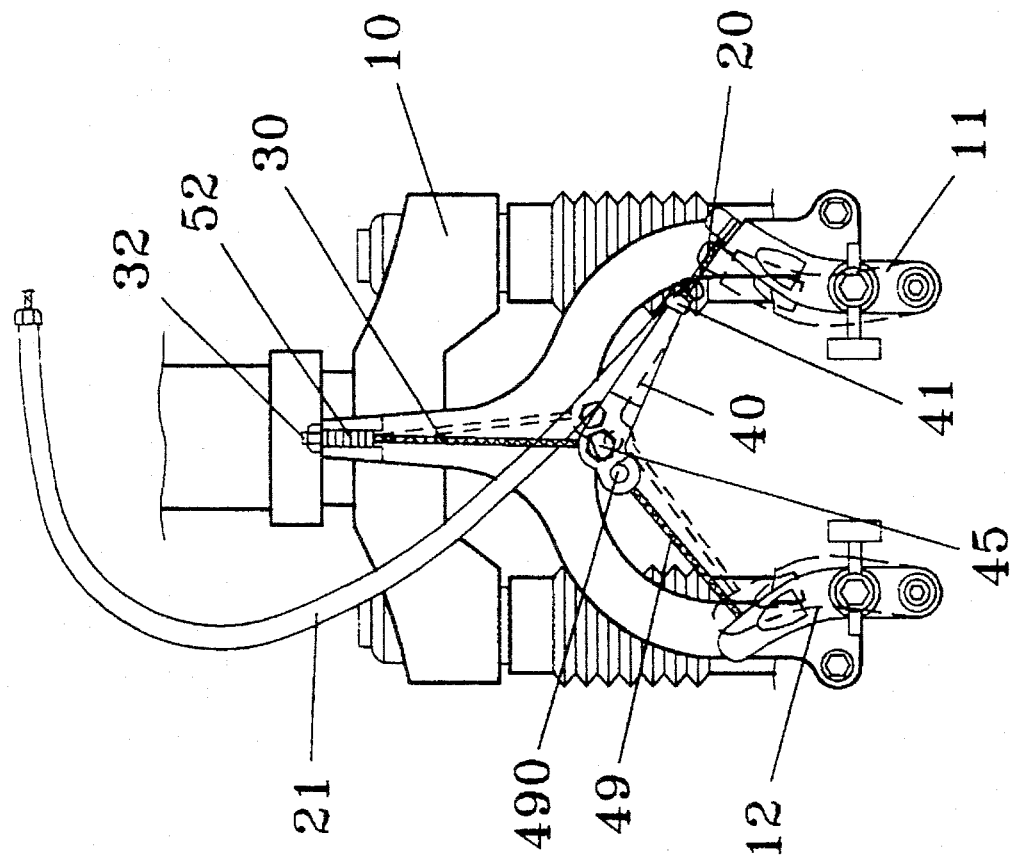
Figure 5:
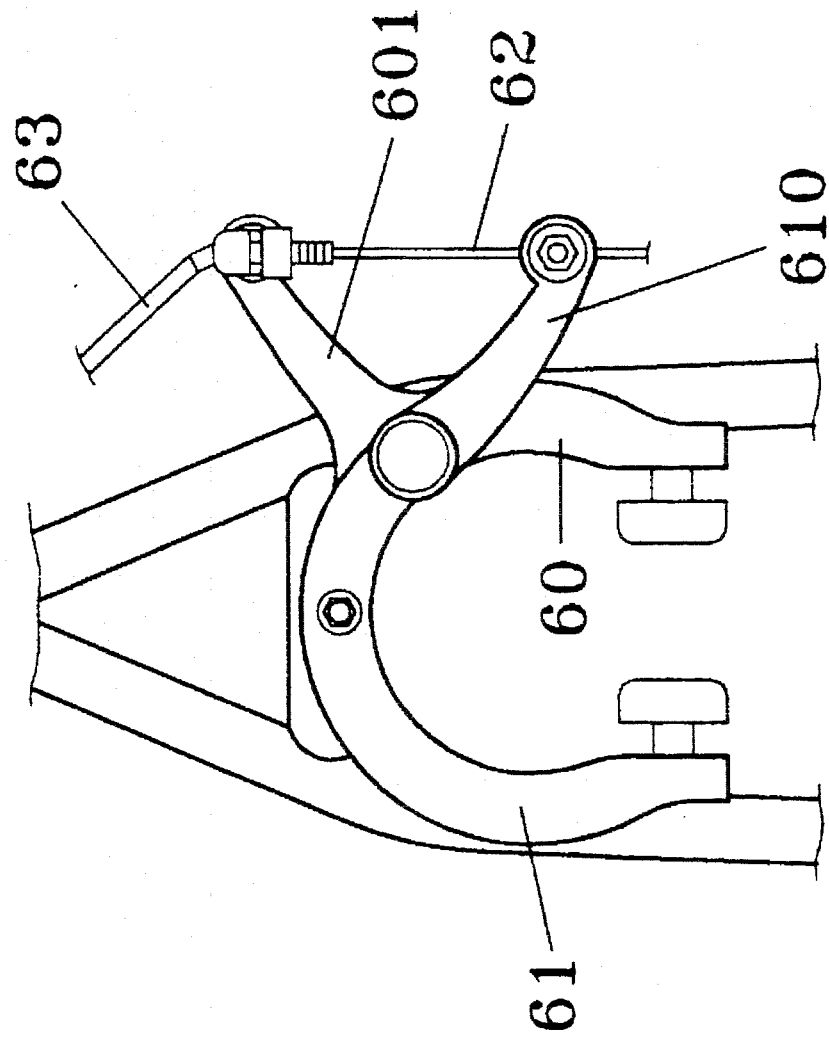
FIGS. 5 and 6 are plane views illustrating two typical bicycle brake mechanisms.
Figure 6:
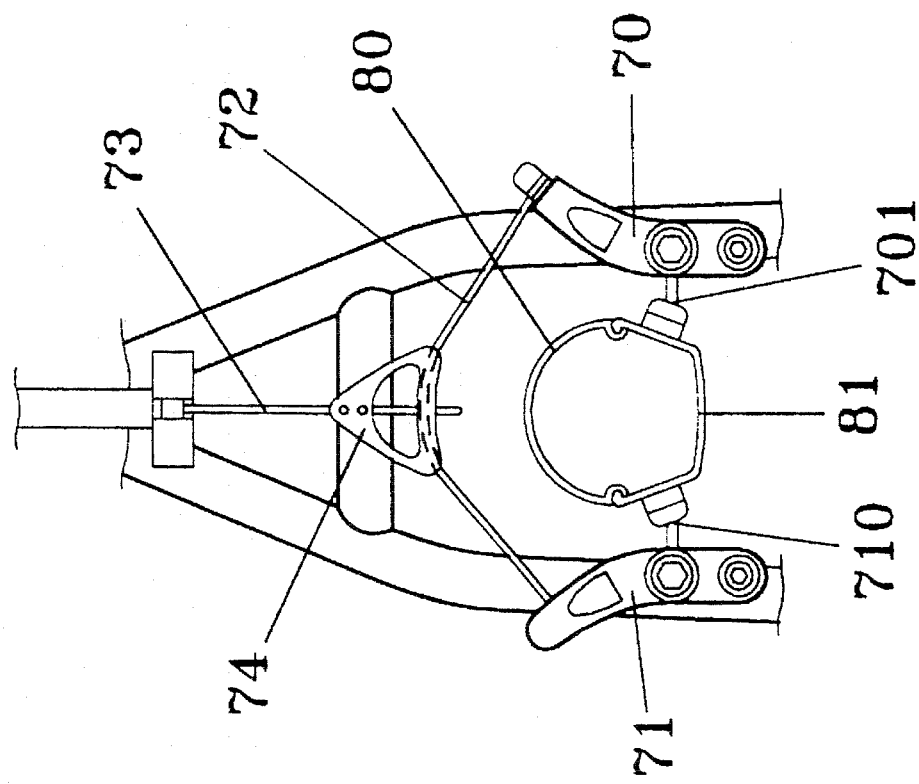

In operation, as shown in FIGS. 3 and 4, the brake arm 11 may be pulled toward the coupler 40 by the cable 20, and relatively, the coupler 40 may be forced toward the brake arm 11 such that the brake shoes of the brake arms 11, 12 may be forced to engage with the bicycle wheels for braking purposes.

Accordingly, the bicycle brake mechanism in accordance with the present invention includes a cable 49 having a head 490 that may be easily disengaged from the coupler 40. The brake mechanism may be easily operated.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A brake mechanism for coupling to a bicycle frame comprising:

a pair of brake arms for pivotal coupling to the bicycle frame, a coupler including an opening formed therein and including a first end having a ring formed therein, said ring including a puncture communicating with said opening, said coupler including a middle portion and a second end, a first cable means for coupling said middle portion of said coupler to the bicycle frame, a second cable means coupling a first of said brake arms to said second end of said coupler, a sleeve including a first end engaged in said opening of said coupler and engaged with said ring, and a third cable means engaged in said sleeve and including a first end engaged through said puncture of said ring and secured to a second of said brake arms, said brake arms being operated and actuated when said second brake arm is pulled toward said coupler relatively by said third cable means.

2. A brake mechanism according to claim 1, wherein said second end of said coupler includes a hole and a notch formed therein, said second cable means includes a first end having a stud secured thereto, said stud includes a first end for engaging with said hole of said coupler and includes a second end for engaging with said notch of said coupler, said stud is disengaged from said coupler when said second end of said stud is disengaged from said notch of said coupler.

* * * * *